Patented May 23, 1933

1,910,419

UNITED STATES PATENT OFFICE

FRED H. AMON, OF WESTON, MASSACHUSETTS, ASSIGNOR TO GODFREY L. CABOT, INC., OF BOSTON, MASSACHUSETTS, A CORPORATION OF MASSACHUSETTS

METHOD OF PRODUCING COLORED CONCRETE

No Drawing. Application filed March 6, 1931. Serial No. 520,717.

This invention relates to the art of producing colored concrete, and in the term concrete is included all compositions of cement and materials of mixed ingredients which have the property of setting to produce a rigid structure.

My invention comprises an improved method of producing colored concrete, which is characterized by the use of a powdered pigment in the form of a liquid suspension. It includes also within its scope the improved colored concrete herein shown as produced by the method of my invention.

An important field of use of my invention is in the production of colored sections or stripes in concrete road surfaces, imitation marble for interior finish, soda fountains, tiles, friezes, panels or the like. In the production of colored concrete, it has been the practice heretofore to employ such pigments as carbon black or various metallic oxides in powdered or paste form. However, in order to produce concrete having a color of satisfactory character and intensity, it has been necessary to include in its composition an amount of pigment which has had a detrimental effect upon the strength of the resulting structure. For example, in order to produce a black concrete of acceptable color, it has been sometimes necessary to include as much as 10%, dry weight, of the carbon black, with a resulting reduction of compressive strength in the set concrete to below 70% of that of uncolored concrete otherwise of the same composition. The present invention deals with this problem and its object is the production of colored concrete of high compressive strength, satisfactory color and low pigment content.

I have discovered that by employing in the concrete mix pigment colloidally dispersed in a liquid, I am enabled to secure satisfactory colors with pigment contents less to a striking degree than have been heretofore required and, moreover, because of the smaller quantity included and because of its colloidal form, the strength of the colored product is reduced only by a negligible amount. For example, I have found it entirely practicable to produce with 3% content of dispersed carbon black a black concrete comparing favorably in color to that containing 10% carbon black of commercial form, and in the structure so produced in accordance with my invention the reduction of strength resulting from the addition of the pigment does not exceed 3 or 4%.

For purposes of illustration, I will now describe the practice of my improved method as applied to the production of a novel black or dark colored concrete, such as is suitable for road bed structure.

One satisfactory mixture for such uses includes one part Portland cement, two parts sand and four parts gravel, all by dry and loose volumes. These ingredients, with the addition of the colloidally dispersed pigment about to be described, may be mixed and poured in accordance with the usual commercial practice.

A liquid suspension of the carbon black may be prepared by stirring or beating the carbon black in water in approximately the proportions of one pound of carbon black to two pounds of water, thus producing a smooth paste. In this way a very definite and uniform separation or dispersion of the individual particles of carbon black is brought about and this is assisted by the addition of a colloidal dispersing agent. For such purpose may be employed a soap solution, saponin, nigrosine, or any other material capable of acting as dispersing agent for the carbon black particles.

While it is practical under some conditions to employ carbon black of any commercial degree of fineness, I prefer carbon black made by the channel or impingement process for in employing this particular pigment the desirable results above outlined are intensified, that is to say, a more intense color is secured in the product for a minimum amount of pigment and the compressive strength of the resulting concrete is less reduced.

As an example of the result secured, it may be stated that a sample block of uncolored concrete of the composition above set forth possesses a compressive strength of approximately 2275 pounds per square inch after setting for 7 days. When this same composition is colored by the addition of impalpable carbon black in colloidally dispersed form in an amount equal to 3% of the cement employed, the compressive strength of the set concrete was reduced to 2245 pounds per square inch, which represents a reduction in strength of less than 2%. The color of the sample, however, in its intensity corresponds substantially to the color secured in the same mixture by the addition to the cement portion of 10% of commercial carbon black not colloidally dispersed and in a sample thus colored the compressive strength is reduced to 1500 pounds per square inch, which represents a reduction in strength of about 34%.

Having thus described the improved method of my invention and its novel product, what I claim as new and desire to secure by Letters Patent of the United States is:

1. The method of producing dark colored concrete without substantial loss of strength, which consists in forming a paste of a colloidal suspension of impalpable carbon black in water, mixing said paste with the ingredients of the concrete, and subsequently pouring the concrete.

2. In a method of producing a dark colored concrete of relatively high compressive strength, the step of adding to the concrete mixture carbon black in colloidal suspension in an amount approximating 3% of the cement content thereof.

3. In a method of producing an intense permanent black concrete of high compressive strength, the step of adding to the concrete mixture carbon black in an amount equal approximately to 3% of the cement content of the mixture, said carbon black being in colloidal suspension with nigrosine as a dispersing agent.

4. An improved dark colored concrete of relatively high compressive strength having distributed throughout its mass carbon black, the particles of which are dispersed in colloidal form in the concrete, as produced by the method of claim 1.

5. An improved dark colored concrete of relatively high compressive strength having distributed throughout its mass carbon black in colloidal form of an amount approximating 3% of the cement content of the concrete, as produced by the method of claim 2.

FRED H. AMON.